US009876810B2

United States Patent
McDougal et al.

(10) Patent No.: US 9,876,810 B2
(45) Date of Patent: Jan. 23, 2018

(54) SYSTEMS AND METHODS FOR MALWARE LAB ISOLATION

(71) Applicant: Raytheon Company, Waltham, MA (US)

(72) Inventors: Monty D. McDougal, St. Paul, TX (US); Eric G. Dodge, Silver Spring, MD (US); Julian A. Zottl, Springfield, VA (US)

(73) Assignee: Raytheon Company, Waltham, MA (US)

( * ) Notice: Subject to any disclaimer, the term of this patent is extended or adjusted under 35 U.S.C. 154(b) by 129 days.

(21) Appl. No.: 14/959,547

(22) Filed: Dec. 4, 2015

(65) Prior Publication Data

US 2017/0163665 A1 Jun. 8, 2017

(51) Int. Cl.
*H04L 29/06* (2006.01)
*H04W 12/06* (2009.01)
(Continued)

(52) U.S. Cl.
CPC .......... *H04L 63/1416* (2013.01); *G06F 21/56* (2013.01); *H04L 12/2801* (2013.01);
(Continued)

(58) Field of Classification Search
CPC . H04L 63/1416; H04L 63/02; H04L 12/2801; H04L 63/20; H04L 63/1433;
(Continued)

(56) References Cited

U.S. PATENT DOCUMENTS

| 7,490,353 B2 * | 2/2009 | Kohavi | G06F 21/51 |
| | | | 713/189 |
| 7,895,326 B2 * | 2/2011 | Jerrim | G06F 21/552 |
| | | | 709/224 |

(Continued)

FOREIGN PATENT DOCUMENTS

WO WO-2017096132 A1 6/2017

OTHER PUBLICATIONS

"International Application Serial No. PCT/US2016/064565, International Search Report dated Feb. 6, 2017", 3 pgs.
(Continued)

*Primary Examiner* — David Garcia Cervetti
(74) *Attorney, Agent, or Firm* — Schwegman Lundberg & Woessner, P.A.

(57) ABSTRACT

Generally discussed herein are systems, devices, and methods for malware analysis lab isolation. A system can include a malware analysis zone LAN in which malware analysis is performed, a separation zone LAN communicatively connected to the malware analysis zone LAN, the separation zone LAN providing access control to manage communication of data between other LANs of the plurality of LANs, an analyst zone LAN communicatively connected to the separation zone LAN, and a remote access zone LAN communicatively connected to the separation zone LAN, the remote access zone LAN providing a user LAN with results from the malware analysis zone LAN and the analyst zone LAN and providing an item for malware analysis by the malware analysis zone LAN.

20 Claims, 5 Drawing Sheets

(51) Int. Cl.
*H04W 12/08* (2009.01)
*H04L 12/28* (2006.01)
*G06F 21/56* (2013.01)

(52) U.S. Cl.
CPC .......... *H04L 63/02* (2013.01); *H04L 63/0209* (2013.01); *H04L 63/1433* (2013.01); *H04L 63/20* (2013.01); *H04W 12/06* (2013.01); *H04W 12/08* (2013.01)

(58) Field of Classification Search
CPC .. H04L 63/0209; H04W 12/08; H04W 12/06; G06F 21/56
See application file for complete search history.

(56) References Cited

U.S. PATENT DOCUMENTS

| | | | | |
|---|---|---|---|---|
| 8,301,727 | B1* | 10/2012 | Coburn | H04L 63/0227 709/218 |
| 8,438,637 | B1* | 5/2013 | Gryaznov | H04L 63/1416 726/22 |
| 8,510,821 | B1* | 8/2013 | Brandwine | H04L 63/1416 709/229 |
| 8,635,079 | B2 | 1/2014 | McDougal et al. | |
| 9,009,820 | B1 | 4/2015 | McDougal et al. | |
| 9,100,422 | B1* | 8/2015 | Tidwell | H04L 63/1408 |
| 9,483,742 | B1* | 11/2016 | Ahmed | G06N 99/005 |
| 2002/0157020 | A1* | 10/2002 | Royer | H04L 63/1441 726/11 |
| 2005/0060535 | A1* | 3/2005 | Bartas | H04L 63/145 713/154 |
| 2005/0080888 | A1* | 4/2005 | Walter | H04L 63/145 709/223 |
| 2005/0114658 | A1* | 5/2005 | Dye | G06F 21/55 713/165 |
| 2006/0117385 | A1* | 6/2006 | Mester | G06F 21/552 726/22 |
| 2006/0117387 | A1* | 6/2006 | Gunsalus | H04L 63/145 726/24 |
| 2006/0130142 | A1* | 6/2006 | Mester | H04L 51/12 726/23 |
| 2006/0294579 | A1* | 12/2006 | Khuti | H04L 63/02 726/3 |
| 2008/0222532 | A1* | 9/2008 | Mester | H04L 63/145 715/738 |
| 2010/0071024 | A1* | 3/2010 | Eyada | H04L 63/0263 726/1 |
| 2010/0191846 | A1* | 7/2010 | Raleigh | G06Q 10/06375 709/224 |
| 2011/0067107 | A1* | 3/2011 | Weeks | G06F 21/55 726/23 |
| 2011/0261816 | A1* | 10/2011 | Morris | H04L 45/00 370/392 |
| 2012/0330863 | A1* | 12/2012 | McDougal | G06Q 10/06 705/400 |
| 2013/0139260 | A1* | 5/2013 | McDougal | H04L 63/1433 726/23 |
| 2015/0039757 | A1* | 2/2015 | Petersen | H04L 63/0227 709/224 |
| 2015/0047034 | A1* | 2/2015 | Burnham | H04L 63/1441 726/23 |
| 2016/0050225 | A1* | 2/2016 | Carpenter | H04L 63/1433 726/25 |
| 2016/0261611 | A1* | 9/2016 | Heilig | H04L 63/1425 |
| 2017/0149775 | A1* | 5/2017 | Bachar | H04L 63/0876 |

OTHER PUBLICATIONS

"International Application Serial No. PCT/US2016/064565, Written Opinion dated Feb. 6, 2017", 6 pgs.

* cited by examiner

SYSTEMS AND METHODS FOR MALWARE LAB ISOLATION

TECHNICAL FIELD

Embodiments discussed herein generally relate to malware analysis lab isolation while still supporting secure local access and secure remote access.

BACKGROUND

Existing malware analysis labs are commonly completely isolated from Local Area Networks (LANs). These labs can be completely communicatively isolated such that no data may be communicated out of or into the lab from a source external to the malware analysis lab network. However, communication into and out of the malware analysis lab can be beneficial.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to malware analysis lab isolation. Some embodiments include Local Area Networks (LANs) communicatively coupled to each other. One or more embodiments provide a practical design for a malware analysis lab that supports isolation of malware (secure from malware escape) while still supporting local access and remote access to the malware analysis lab.

In many instances, different LANs and even different nodes of a LAN have different levels of security. Transferring content between the security boundaries without compromising security of the LAN, node, and/or the content that is communicated therebetween can be difficult. Preventing improper transfer of information through error or under the control of threat actors can broach information assurance controls or security. Transferring the content between security boundaries is one way that malware is transferred across security boundaries. Such malware can broach a higher security network or node or provide content with higher privileges requirements than a node or network possesses.

In the context of malware analysis, the malware analysis and analyst nodes or LANs are lower security, sometimes referred to as "low side". Sensitive information may be prohibited from being stored on or near these nodes or networks. All other nodes or networks are generally higher security than the malware analysis and analyst nodes. These other nodes are sometimes referred to as "high side". Note that high side and low side are relative terms. A first node can be considered a low side node as compared to a second node and a high side node as compared to a third node. In one or more embodiments, data coming from a high side node or network can have different, more stringent, safeguards than data coming to the high side node or network.

A LAN as used herein includes interconnected computers (e.g., connected using Ethernet, Wi-Fi®, or other connection technology) within a limited geographical area. A LAN can include a variety of network devices, such as switches, firewalls, routers, scanners, printers, telephones, computing devices (e.g., tablets, laptops, desktop computers, and so forth), load balancers, and/or sensors LANs can maintain connections with other LANs using a virtual private network (VPN) or other LAN connection technologies, such as Multiprotocol Label Switching (MPLS). The MPLS allows a LAN to have WAN connectivity. A LAN includes routable and routed connections between nodes without security controls therebetween. A boundary between LANs exists where a security control restricts or prohibits the flow of communications from one LAN to another.

Figure 1:
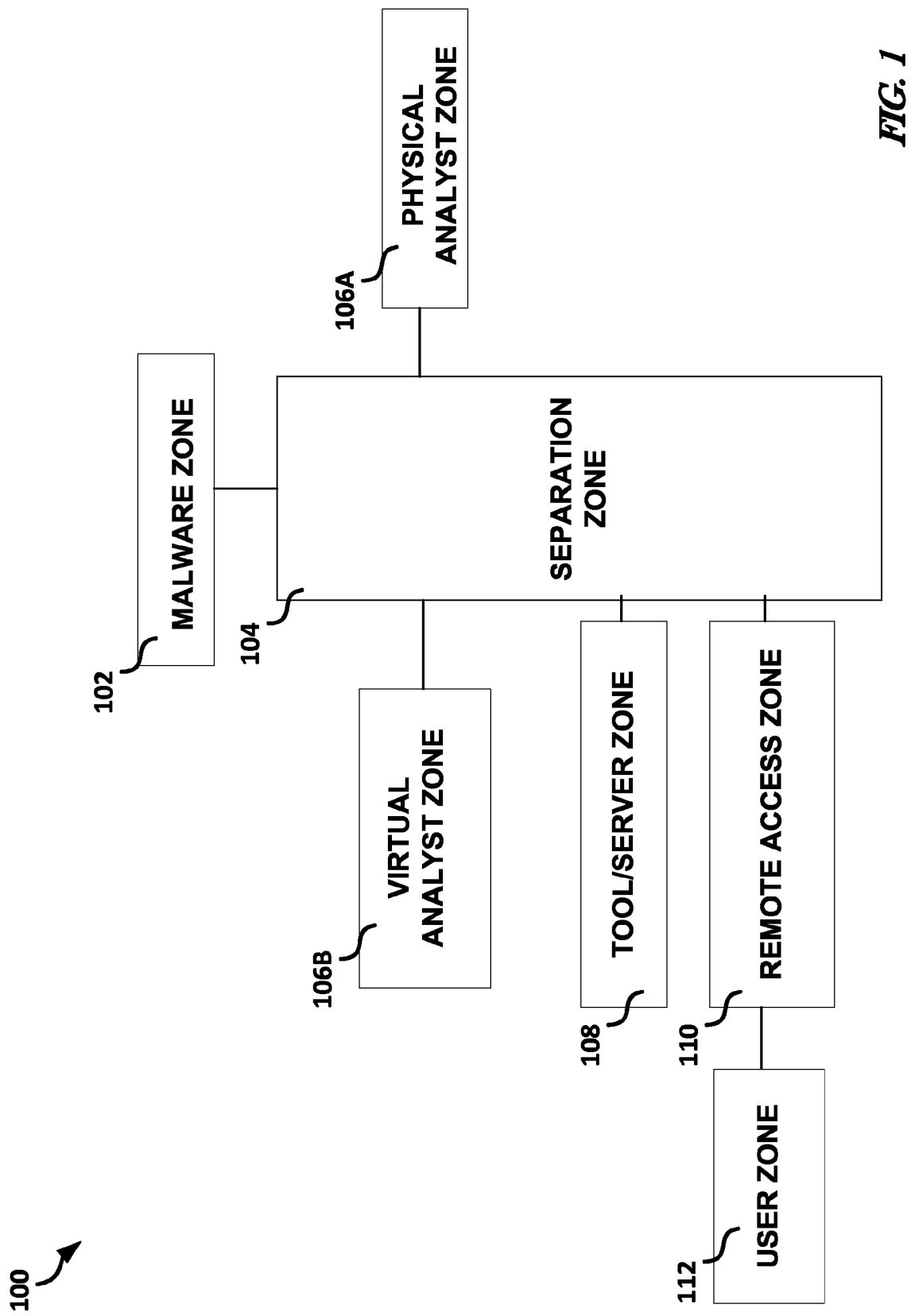
FIG. 1 illustrates, by way of example, a block diagram of an embodiment of a system for malware analysis lab isolation that provides local and remote access to the malware analysis lab.

FIG. 1 illustrates, by way of example, a block diagram of an embodiment of a system 100 for malware lab isolation that provides local and remote access to the malware analysis lab. The system 100 as illustrated includes local area networks (LANs) communicatively coupled to each other. Each LAN is labeled as a zone in the FIGs. The LANs, as illustrated include a malware analysis zone 102, a separation zone 104, a virtual environment analyst zone 106A, a physical environment analyst zone 106B, a tool/server zone 108, a remote access zone 110, and a user zone. Each zone generally has differing security requirements and/or permissions levels.

The malware analysis zone 102 is the environment in which content (software, a script, a device, or other content that can be the victim of malware) is executed or operated, such as to determine whether the content has malware or record details regarding the operation of the content that is later analyzed to determine whether the content includes malware. Malware can take a variety of forms and can operate in a variety of ways. The malware analysis zone 102 can perform one or more of a signature analysis, a heuristic analysis, a dynamic behavioral analysis, a static code analysis, a code branch execution analysis, capturing running memory, capturing network traffic, and/or a hash analysis on the data received.

A signature analysis includes determining if content includes a specific bit or byte pattern. For example, the bit sequence "1100110011001100" can be associated with malware. The malware analysis zone 102 can determine if the content includes that bit sequence, and if it is not detected, the malware analysis zone 102 can record, such as in a log file or report associated with the content, that the content does not include that bit sequence.

A heuristic analysis is a method of detecting a variant of known malware or a new type of malware. As malware mutates or is changed (e.g., to attack a different system type or to get through malware detection software) the code or signature of the malware changes. Families of malware, however, retain commonalities with other malware in the family. These commonalities can be detected by creating a single signature that encapsulates the similarities between the malware in the family with one or more non-contiguous code identifiers (e.g., wild card characters) where differences between members of the malware family occur. A malware detection scheme can thus detect if content is a member of the family regardless of differing code inserted in place of the wild card(s). This information can be recorded in the log or the report.

A fuzzy hash analysis includes determining a plurality of hash values (e.g., a checksum, and MD5 hash, an SHA1 hash, or other hash) on respective portions of the contents and/or metadata of the file and comparing the determined hash value(s) to hash values of a document known to be malware. If a specified number or percentage of the determined hash value(s) matches hash values of a file known to be malware, the file can be determined to include malware. Fuzzy hash analysis can include hashing content of a file in a sliding window or in blocks. The number, percentage, or other result of this analysis can be recorded in the log or record.

A behavioral analysis includes executing commands of content, such as in an isolated (e.g., virtual) environment and monitoring the commands as they are performed. If the commands performed exhibit malware type behavior(s), the content can be determined to include malware. Results of the behavioral analysis can be recorded in a log file or record of the malware analysis performed on the content.

A code analysis includes examining assembly level code or decompiling the code into a higher level language, such as an object oriented language (e.g., C++ and so forth). The decompiled code or assembly level code can be reviewed by one or more automated tools or a human.

The system 100 as illustrated includes a separation zone 104. The separation zone 104 provides isolation for the LANs (e.g., physical (PLAN) and/or virtual LANs (VLAN)) of the system 100. The separation zone 104 can implement port-based access controls, such as to help prevent malware spreading between zones, such as can be implemented using a network layer firewall. The access controls can define which zones, and/or which nodes of which zones, can communicate to each other. The separation zone 104 securely transfers a communication from an originating zone to a destination zone. The separation zone 104 is communicatively coupled to the malware analysis zone 102, a PLAN analyst zone 106A, a VLAN analyst zone 106B, a tool/server zone 108, and a remote access zone 110. In one more embodiments, any communication between the malware analysis zone 102, the analyst zone 106A-B, the tool/server zone 108, and/or the remote access zone 110 must first go to the separation zone 104 and be vetted and approved by the access controls and/or other evaluations performed by the separation zone 104, before it is provided to the destination zone.

Only content that is inspected and verified as originating from a permitted zone is forwarded to the destination zone. Erroneously routed content due to error, insufficient permissions or rights, or through control of malware or a proxy processes is terminated. One or more embodiments can provide enhanced protection from: (a) errors in underlying components enabling improper information transfers, and/or (b) threat actors compromising single components and enabling covert transfers of information at zone boundaries.

The system 100 as illustrated includes the physical analyst zone 106A and the virtual analyst zone 106B. The analyst zone 106A-B performs non-execution malware analysis on content. The physical analyst zone 106A provides physical machines at which non-execution malware analysis is performed and the virtual analyst zone 106B provides a persistent virtual host for non-execution malware analyst operations. The non-execution malware analysis can include any of the malware analyses previously discussed that do not require execution of the content to be analyzed for malware. Execution of the content can include opening a file, running a program, opening an attachment, or other ways in which malware can be triggered to operate. Non-execution analysis can include interpreting results from the malware analysis zone 102, such as to determine whether content includes malware, a type of malware that the content includes, remedial actions to be taken in response to determining content has malware, performing a signature or hash analysis, string analysis, dis-assembly, reverse engineering, analyzing data recorded in the malware analysis zone 102, sorting the content being analyzed into malware taxonomies and/or lineage/ancestry, and/or so forth.

The results from the malware analysis performed by the malware analysis zone 102 is provided to the analyst zone 106A-B (by way of the separation zone 104). These results can be in the form of a file, such as a text file, that details information pertinent to determining whether the content includes malware, the type of malware that the content includes, remedial actions to be taken in response to determining content has malware. The analysts using the analyst zone 106A-B can interpret or analyze the results from the malware analysis zone 102 and/or the non-execution analysis performed by the machines and/or analysts of the analyst zone 106A-B and make a determination as to what action, if any, is to be taken with regard to the content. Actions can include informing users (of the user zone 112) that the content is malware, potentially malware, or not malware, eradicating the content from the user zone 112, quarantining the content from the user zone 112, and so forth. Note that the analysis zone 106A-B does not have unregulated access to the user zone 112. The actions can be taken from the user zone 112, but the actions to be taken can be decided from the analyst zone 106A-B. A report detailing the actions to be taken from the analyst zone 106A-B can be accessed, but only after passing access control regulation through the separation zone 104. The analyst zone 106A-B can provide a report to a user of the user zone 112, such as through the separation zone 104. The report can detail the results of malware analysis performed by the malware analysis zone 102 and/or the analyst zone 106A-B, such that administrators of the user zone 112 can take measures against malware or potential malware.

The system 100 as illustrated includes the tool/server zone 108 communicatively coupled to the separation zone 104. The tool/server zone 108 is accessible by the analyst zone 106A. The tool/server zone 108 provides sandboxes, file stores, and/or tools to support analysts in performing their malware analysis and recording their malware analysis methodology, results of their methodology, conclusions regarding the malware analysis, and so forth. These services are provided through physical and/or virtualized instances of an operating system and the services loaded thereon.

The system 100 as illustrated includes the remote access zone 110 communicatively coupled between the user zone 112 and the separation zone 104. The remote access zone 110 provides another layer (beyond that provided by the separation zone 104) between the user zone 112 and the lower side zones (e.g., the malware analysis zone 102, the analyst zone 106A-B and/or the tool/server zone 108). The remote access zone 110, in one or more embodiments, includes a dual-homed (i.e. two network interfaces), application based firewall. One network interface manages communications coming from the remote access zone 110 and the other network interface manages communications coming to the remote access zone 110. The remote access zone 110 provides the user zone 112 with secure access to reports or other communications from the analyst zone 106A-B, while keeping untrusted communications from compromising security of the user zone 112. The remote access zone 110 provides another level of permissions and communication management, such as to help prevent unauthorized communications from being provided to the analyst zone 106A-B, the tool/server zone 108, the malware analysis zone 102, and/or the separation zone 104

The remote access zone 110, in one or more embodiments, includes one or more servers (e.g., proxy or application servers). The servers can perform address translation, such as to mask an origin from which a communication was initiated. The servers can implement more strict or conservative security policies for a communication coming to the remote access zone 110, than a network-layer firewall, such as can be included in the separation zone 104 (see FIG. 2).

The user zone 112 is the LAN on which user traffic is generated, sometimes referred to as a corporate network. The user zone 112 is the highest security level or the high side of the system 100. The malware analysis lab isolation system 100 is configured to help ensure that malware provided to the malware analysis lab does not affect the user zone 112. The malware analysis lab, as illustrated in FIG. 1, can include all the zones with the exception of the user zone 112, the remote access zone 110, and/or the separation zone 104.

Figure 2:
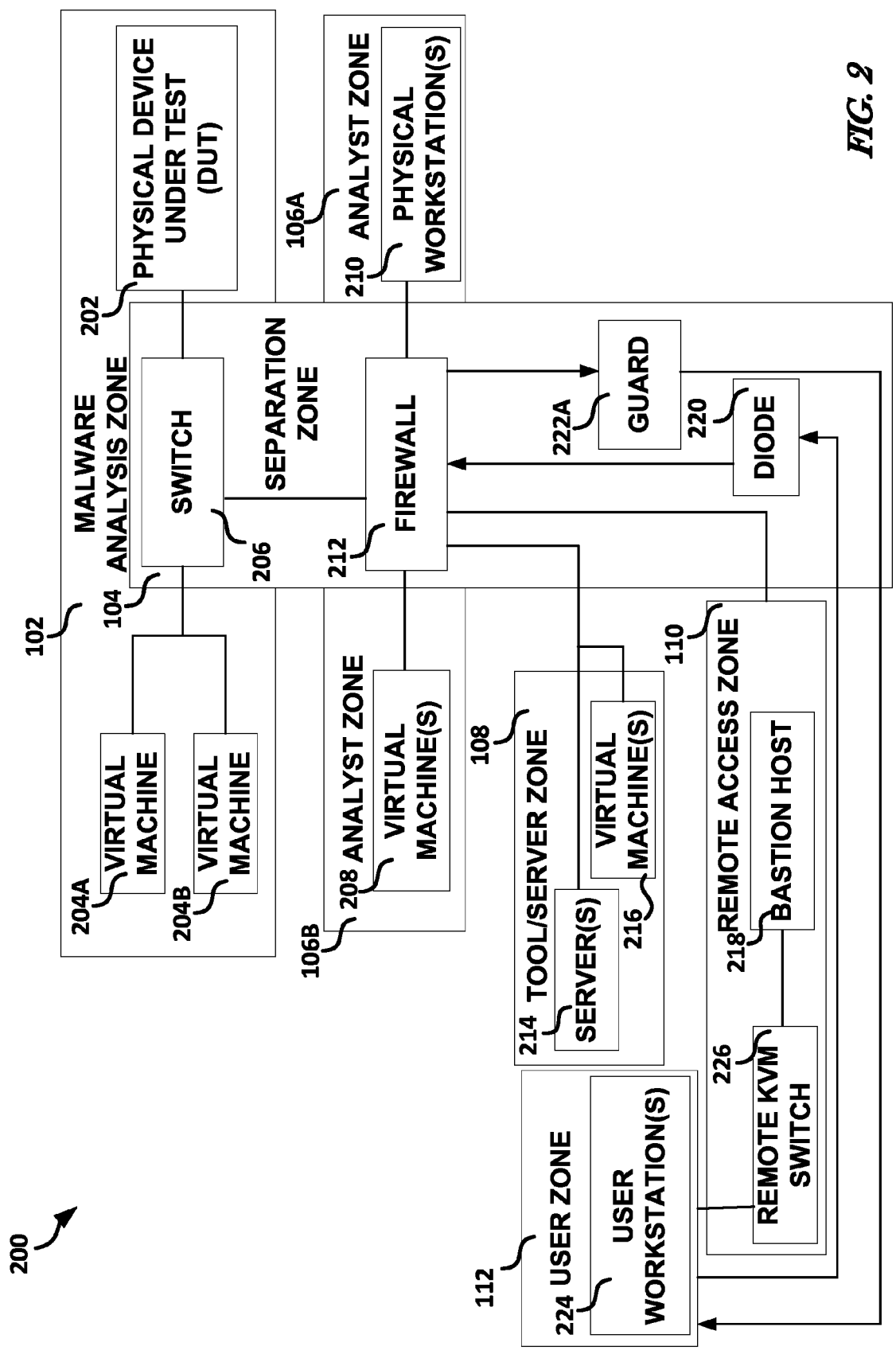
FIG. 2 illustrates, by way of example, a block diagram of an embodiment of another system for malware analysis lab isolation that provides local and remote access to the malware analysis lab.

FIG. 2 illustrates, by way of example, an embodiment of a system 200 for malware analysis lab isolation that provides local and remote access to the malware analysis lab. The system 200 as illustrated includes the same LANs as the system 100, with more detail regarding the items of the LANs and connections therebetween. The LANs, as previously discussed, include the malware analysis zone 102, the separation zone 104, the analyst zone 106A-B, the tool/server zone 108, the remote access zone 110, and the user zone 112. The LANs can each be communicatively coupled to another LAN using one or more of a cable (e.g., an Ethernet cable), internet, router, switch, and so forth.

The malware analysis zone 102 as illustrated includes a physical device under test (DUT) 202 and a plurality of virtual machines 204A and 204B. The physical DUT 202 and the virtual machines 204A-B are separated by a data switch 206 of the separation zone 104. In one or more embodiments, the data switch 206 prevents any communications travelling between the virtual machine(s) 204A-B and the DUT 202. The virtual machines 204A-B provide an environment in which execution based malware analysis can be performed, such as without infecting a physical machine. The DUT 202 is a device that may be suspected of having malware or is otherwise undergoing diagnostic analysis in the malware analysis zone 102. Examples of DUTs include a refrigerator, dishwasher, other household appliance, vehicle (e.g., aircraft, car, truck, watercraft, and so forth), or other device that includes software, firmware, a processor, or can otherwise be affected by malware.

The analyst zone 106A as illustrated includes physical work station(s) 210. An analyst can request the virtual machine(s) 204A-B, the DUT 202, virtual machine(s) 208, server(s) 214, and/or the virtual machine(s) 216 to perform one or more operations. For example, the analyst can cause a series of instructions to be executed by the DUT 202. The behavior of the DUT 202 can be recorded (on a machine local to the DUT 202, the local machine not shown in FIG. 2) and provided to the analyst workstation 210, such as through a network layer firewall 212. In another example, the analyst can queue an execution-based malware analysis job to be performed by the virtual machines 204A-B or a non-execution based malware analysis job to be performed by the virtual machine(s) 208. In another example, the analyst can request the server(s) 214 or the virtual machine(s) 216 perform result analysis or provide documents or other information to the workstation 210.

Non-execution malware analysis can include interpreting results of malware analysis performed by devices on the malware analysis zone 102, such as to determine whether content includes malware (e.g., likely includes malware), potential malware (e.g., is not likely to include malware), or does not include malware. The non-execution malware analysis can include comparing results from the execution-based malware analysis to previous malware analyses performed and determining a likelihood that the content includes malware based on the comparison to the previous performed analyses.

The separation zone 104 as illustrated includes the firewall 212, a guard 222, and a data diode 220. The firewall 212 performs port-based access control of communications, sometimes referred to as "packets" therethrough. A communication is only allowed through the firewall 212 if attribute(s) of the communication abide by a specified set of rules (e.g., access controls). The rules can include rules regarding one or more of source and/or destination internet protocol (IP) address, source and/or destination user datagram protocol (UDP) port, source and/or destination transmission control protocol (TCP) port, current stage of a communication's lifetime (e.g., communication initiation, data transfer, or completion), destination service, time to live (TTL) value, netblock of the source, and/or so forth. If a packet does not match an existing communication, it can be evaluated according to a ruleset for new communications. If a packet matches an existing communication (a non-completed communication), it can be allowed to pass without further processing, in one or more embodiments, or it can be evaluated according to a ruleset for active communications.

The server(s) 214 and/or virtual machine(s) 216 of the tool/server zone 108 can include a data repository, sandbox, and/or application(s) not otherwise local to the workstation(s) 210, and/or the virtual machine(s) 204A-B and 208. A sandbox is a security mechanism for separating running applications. A sandbox can be implemented by providing a restricted operating system environment and executing the application in the restricted operating system environment. The sandbox limits the resources that can be accessed by the application. A sandbox is generally predefined environment that can control access to entities and tools within the sandbox. The workstation(s) allow someone to be physically present in the malware lab and access the functionality of the malware lab. In one or more embodiments, most of the computer analysis work can be done on the virtual machine(s) 216, if not all, such as by an analyst physically present at the workstation(s) 210.

The virtual machine(s) 208 executes tools that are normally run on a malware analyst's workstation 210, but for security reasons, are more secure and/or convenient operating on the virtual machine(s) 208. For example, things like doing strings analysis, stepping through code disassembled, network dumps, etc., can be performed on the virtual machine(s) 208 using the workstation(s) 210. Not this generally does not include live disassembly and other running malware tasks, as this is generally accomplished in the malware analysis zone 102.

The tools/server zone 108 includes one or more items such as sandboxes and other support tools like encase, malware repositories, signature databases, threat intelligence databases, and so forth. The items of the tool/server zone 108 generally includes items that support the functions of the malware lab but are not things that would be normally run directly on an analyst's workstation.

The remote access zone 110 as illustrated includes a bastion host 218. The bastion host 218 is a special purpose item (e.g., an application or device that allows a remote desktop connection over a restricted port) configured to withstand malware attacks. The bastion host 218 provides limited resource availability, such as to leave fewer resources vulnerable to attack. After a user logs off or otherwise disconnects from the bastion host 218, the bastion host can reset itself to a known good state. Such a bastion host is considered a non-persistent bastion host. There may be multiple such instances of the application hosted by the remote access zone 110, so as to allow multiple simultaneous connections to the malware analysis lab through the remote access zone 110. The bastion host 218 as illustrated is communicatively coupled to a data diode 220 and a transfer guard 222. The bastion host 218, in embodiments that include the KVM switch 226 can translate network packet traffic to physical (keyboard, display (video), mouse, and so forth).

The transfer guard 222 can implement a one or two-way file transfer protocol, such as over Transmission Control Protocol/Internet Protocol (TCP/IP). The diode 220 can support one way transfer via User Datagram Protocol (UDP), or other communication protocol. The diode 220 prevents improper two way communications or covert exfiltration of content between the remote access zone 110 and the analyst zone 106A-B or the malware analysis zone 102.

The data diode 220 is a device that allows content to travel in only one direction. The data diode 220 permits content to travel from, and not to, the high side domain (the user zone 112). The data diode 220 supports separation of transfer security concerns between high side to low side while providing for covert or erroneous communication protections. An example of a simple data diode includes a modified fiber optic cable with a send device removed from one end and a transmit device removed from the other end. Other data diodes are commercially available and generally include different architectures, such as can include a data diode module from Owl Computing Technologies of Ridgefield, Conn., U.S.A., Fox-IT of Delft, The Netherlands, Tresys Technology LLC of Columbia, Md., U.S.A., Advenica of Lund, Sweden, of VADO security of Petach Tikva, Israel, among others.

The transfer guard 222 provides an interface between the security levels implemented on the high side (the user zone) and those implemented on the low side (the malware lab). The transfer guard 222 can include separation of scanning and validation of content. The transfer guard 222 includes a network interface for the low side and a network interface for the high side. The transfer guard 222 can include a commercial or custom two way cross domain file transfer guard providing content inspection, permissions analysis, and/or separation of domain controls. For content travelling from the low side to the high side, the transfer guard 222 can ensure that nothing malicious escapes the lab to the user zone 112.

In one or more embodiments, the guard 222 can include a human review module (HRM). The HRM provides an additional level of security for communications to/from the malware analysis lab. The HRM can require human input for approving a communication transfer between LANs. The HRM can require input for all communications or just a subset of communications that have specified attributes. For example, a human may be required to review any communications that include an indicator indicating the communication includes malware prior to allowing the communication to the user zone 112, the analyst zone 106A-B or another zone. This review can additionally or alternatively include an advanced malware behavior analysis.

In one or more embodiments, the guard 222 includes an air-gapped solution. An air-gapped solution includes the user zone being free of an active unsecured connection to the malware lab.

As illustrated, the user zone 112 includes user workstation(s) 224. The user workstation(s) 224, similar to the workstation(s) 210, can include any device of the user zone 112 (e.g., desktop computer, tablet, laptop computer, scanner, copier, facsimile machine, telephone, and so forth). The user workstation(s) 224 are generally connected to one another through cables or access points of the user zone 224.

As illustrated, the remote access zone 110 includes a remote keyboard, video, and mouse (KVM) switch 226. The switch 226 uses only one set of keyboard, monitor and mouse inputs to start and interact with multiple computers (the user's computer and the bastion host 218 to which the user is connecting). The KVM switch 226 provides added physical isolation of the bastion host 218, such as to allow a user to only access the bastion host 218 through the switch 226. The remote KVM switch 226 and/or the bastion host 218 allows a user to view output from the malware analysis lab without needing to transfer content out of the malware lab, such as by only providing output display information that provides a view of the content.

In one or more embodiments, a user at user workstation(s) 224 can access the malware analysis lab through the remote access zone 110. A validation and/or verification procedure (implemented by the remote access zone 110) can be performed and passed before a user is permitted access to the malware analysis lab.

Figure 3:
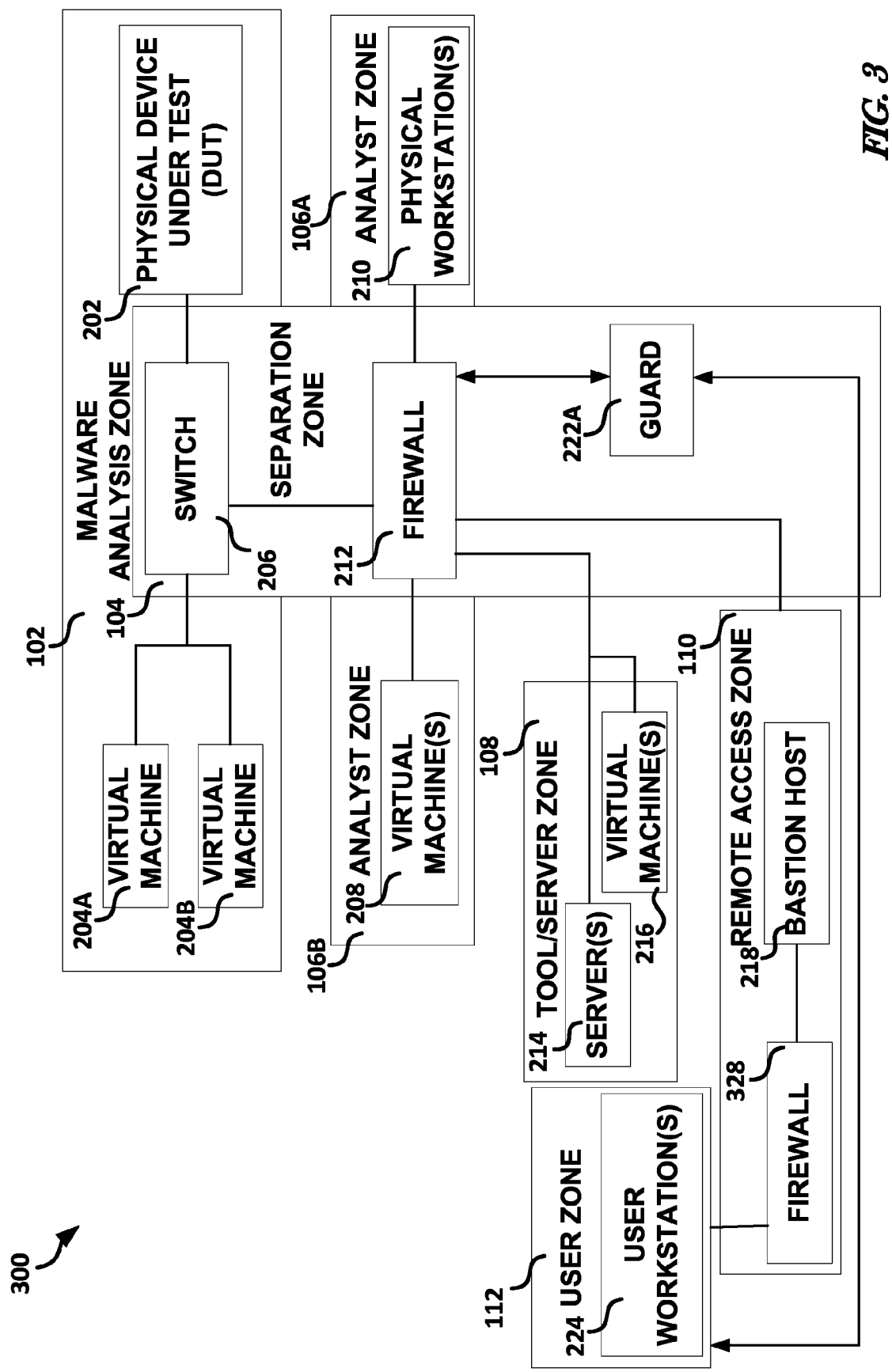
FIG. 3 illustrates, by way of example, a block diagram of an embodiment of another system for malware analysis lab isolation that provides local and remote access to the malware analysis lab.

FIG. 3 illustrates, by way of example, a block diagram of another embodiment a system 300 for malware analysis lab isolation that provides local and remote access to the malware analysis lab. The system 300 is similar to the system 200 with the system including a two-way guard 222A instead of the one-way guard 222 shown in FIG. 2. Also, the system 300 includes a firewall 328 in place of the KVM switch 226. The KVM switch 226 may provide more secure access to the malware lab as no files can be transferred over the KVM switch 226. However, the KVM switch 226 does not allow files to be transferred, while the firewall 328 allows files to be transferred. The firewall 328 is similar to the firewall 212.

Figure 4:
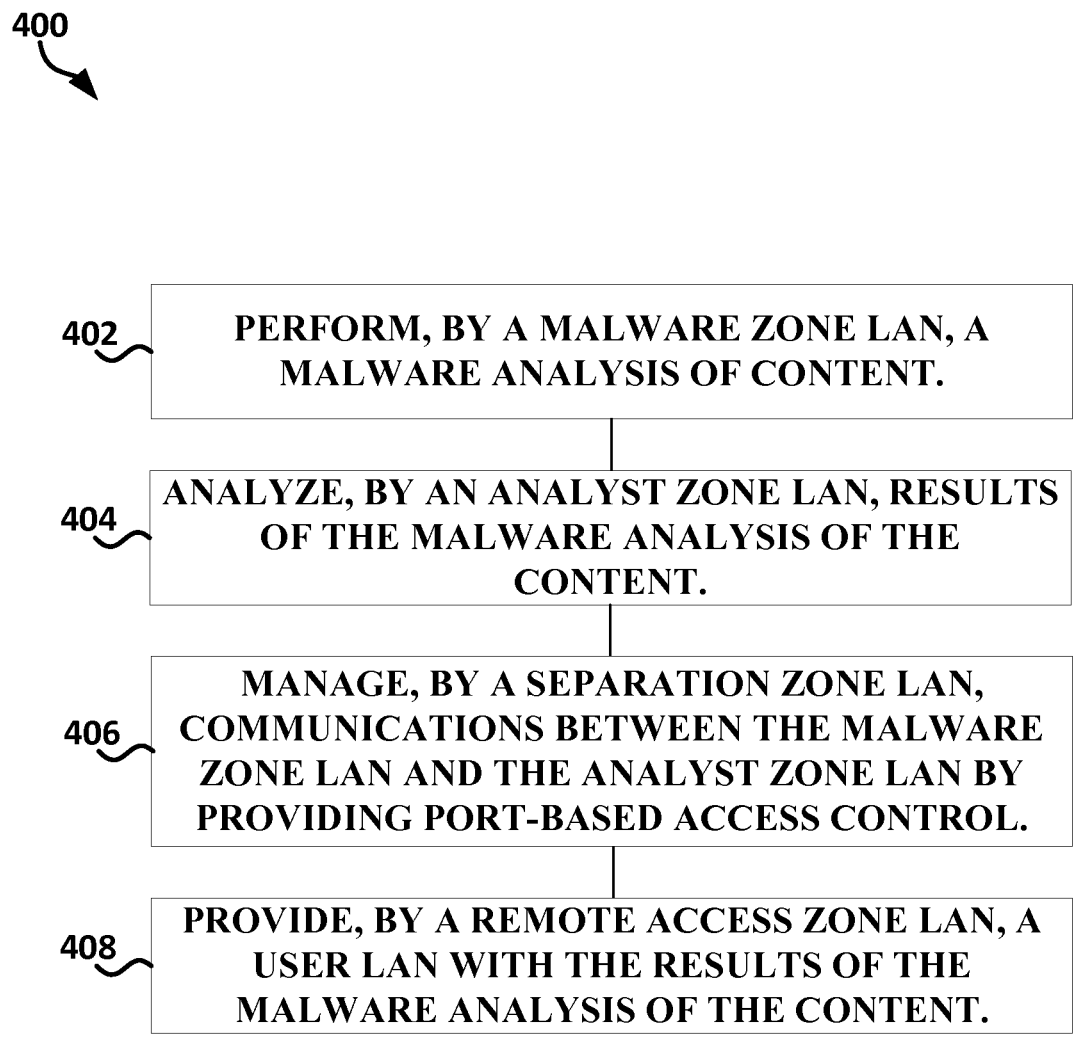
FIG. 4 Illustrates, by way of example, a block diagram of an embodiment of a method for malware analysis lab isolation that provides local and remote access to the malware analysis lab.

FIG. 4 illustrates, by way of example, a diagram of an embodiment of a method 400 for malware analysis lab isolation that provides local and remote access thereto. The method 400 as illustrated includes performing, by a malware analysis zone LAN, a malware analysis of content, at operation 402; analyzing, by an analyst zone LAN, results of the malware analysis of the content, at operation 404; managing, by a separation zone LAN, communications between the malware analysis zone LAN and the analyst zone LAN by providing port-based access control, at operation 406; and providing, by a remote access zone LAN, a user LAN with the results of the malware analysis of the content. The analyst zone LAN can be communicatively coupled to the malware analysis zone LAN through the separation zone LAN such that a communication between the analysis zone LAN to or from the malware analysis zone LAN first goes through and is evaluated by the separation zone LAN. The remote access zone LAN can be communicatively coupled to the analyst zone LAN through the separation zone LAN. In one or more embodiments, the content provided to the malware analysis zone LAN, is provided from a communication by the remote access zone LAN, such as from the user LAN, and through the separation zone LAN.

The method 400 can further include receiving, by the remote access zone LAN, authentication information from the user LAN. The method 400 can further include determining, by the remote access zone LAN, whether the authentication information corresponds to a user with sufficient privileges to access the malware analysis lab. The method 400 can further include, in response to determining the user has sufficient privileges, instantiating a bastion host in the remote access zone LAN through which communications can be made to the separation zone LAN from the user LAN.

The method 400 can further include receiving an indication that the user with sufficient privileges has disconnected form the remote access zone LAN. The method 400 can further include in response to receiving the indication, uninstalling the bastion host from the remote access zone. The method 400 can further include receiving, at a KVM switch communicatively connected between the user zone LAN and the bastion host, the authentication information.

The method 400 can further include regulating, using a data diode communicatively coupled between a firewall of the separation zone LAN and the remote access zone LAN, communications from the remote access zone LAN to only flow to the firewall and not from the firewall to the remote access zone LAN. The method 400 can further include monitoring communications from the firewall to the remote access zone LAN, using a guard communicatively coupled between the firewall and the remote access zone LAN. The method 400 can further include passing the communications to the remote access zone LAN if the communication passes one or more security policy checks enforced by the guard.

Figure 5:
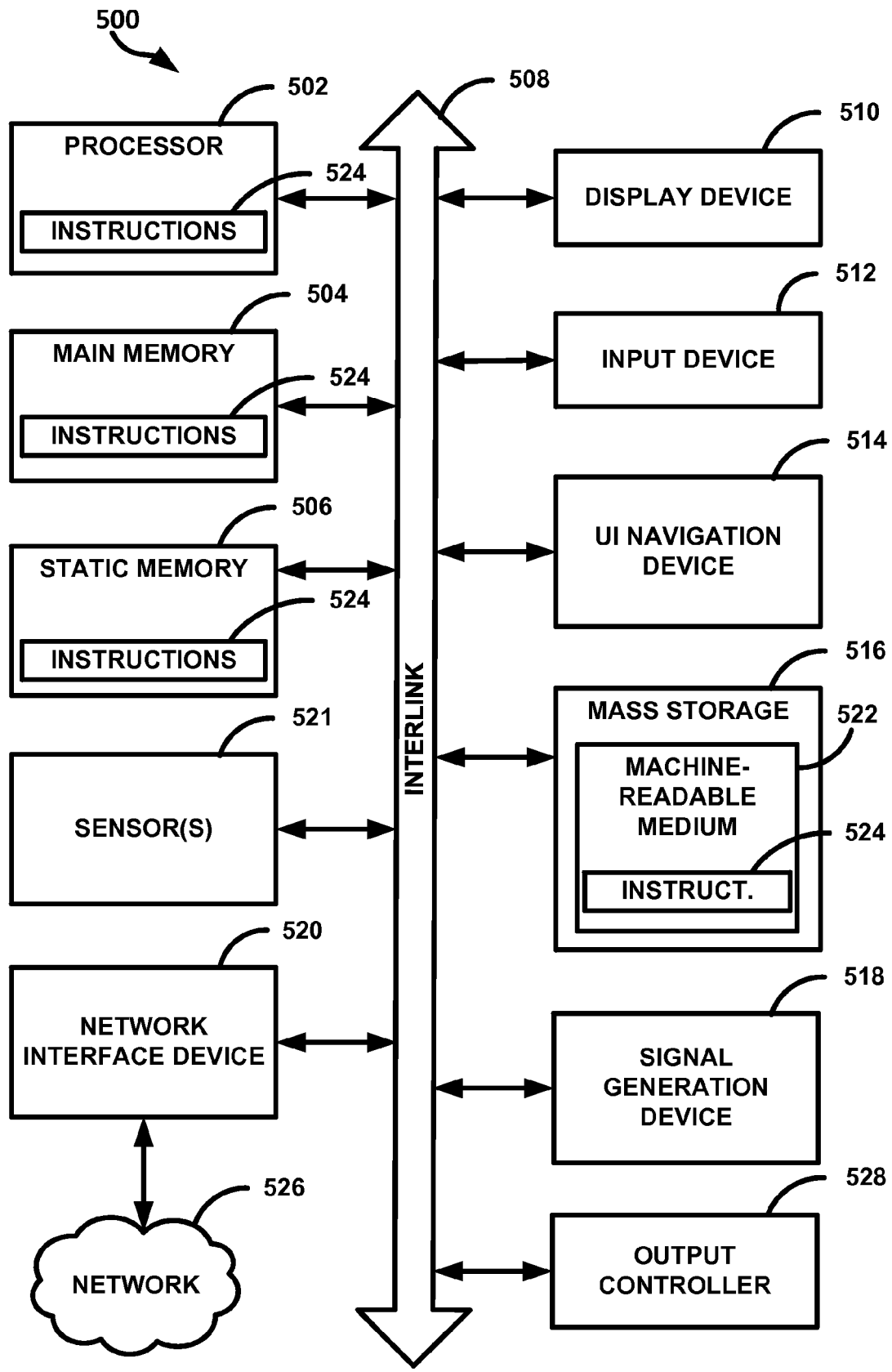
FIG. 5 illustrates, by way of example, a block diagram of an embodiment of a machine on which one or more operations of the methods as discussed herein can be implemented.

FIG. 5 illustrates, by way of example, a block diagram of an embodiment of a machine 500 on which one or more of the methods as discussed herein can be implemented. The machine 500 can include a computing device instantiated as a compute device or server. The machine 500 may be employed to host or be integral to hardware, software, and/or firmware that provides a user (e.g., in real time, near real time, or on demand) with an indication of whether a report was previously submitted regarding a same or similar issue that is being or has been reported by the user. One or more of the zones (e.g., the malware analysis zone 102, the separation zone 104, the analyst zone 106A-B, the tool/server zone 108, the remote access zone 110, and the user zone 112), the workstation(s) 210 and 224, firewall 212 and/or 328, the guard 222 or 222A, the diode 220, the server(s) 214, the bastion host 218, the switch 226, and/or the hardware hosting the virtual machines 204A-B, 208, and 216 can include one or more of the items of the machine 400. In one or more embodiments, the workstation(s) 210 and 224, firewall 212 and/or 328, the guard 222 or 222A, the diode 220, the server(s) 214, the bastion host 218, the switch 226, and/or the hardware hosting the virtual machines 204A-B, 208, and 216 can be implemented using one or more items of the machine 500. In alternative embodiments, the machine 500 operates as a standalone device or may be connected (e.g., networked) to other machines. In a networked deployment, the machine 500 may operate in the capacity to monitor multiple components and circuits and may operate as a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 500 includes a processor 502 (e.g., a central processing unit (CPU), a graphics processing unit (GPU) or both), a main memory 504 and a static memory 506, which communicate with each other via a bus 508. The machine 500 may further include a video display unit 510 (e.g., a liquid crystal display (LCD) or a cathode ray tube (CRT)). The machine 500 may include an alphanumeric input device 512 (e.g., a keyboard), a user interface (UI) navigation device 514 (e.g., a mouse), a disk drive unit 516, a signal generation device 518 (e.g., a speaker) and a network interface device 520.

The memory 504 or 506 are examples of a storage device that can include instructions stored thereon that are executed by a machine, such as a processor or other processing circuitry, and cause the machine to perform operations. The storage device can be programmed and maintained prior to its inclusion in a BIT system. The instructions and other information can be encrypted or otherwise protected by one or more security measures, such as to help protect the operational boundaries and other data stored thereon.

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules described herein can include the firewall 212 and/or 328, the bastion host 218, the diode 220, the guard 222 or 222A, the switch 206, and/or the switch 226. The zones (e.g., the malware analysis zone 102, the separation zone 104, the analyst zone 106A-B, the tool/server zone 108, the remote access zone 110, and the user zone 112) and/or the workstation(s) 210 and 224 can include one or more modules operating thereon. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C, C++, C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

In an example, the hardware can include configurable execution units (e.g., transistors, logic gates (e.g., combinational and/or state logic), circuits, etc.) and a machine readable medium containing instructions, where the instructions configure the execution units to carry out a specific operation when in operation. The configuring can occur under the direction of the executions units or a loading mechanism. Accordingly, the execution units (e.g., processing circuitry, such as can include one or more hardware processors, transistors, resistors, capacitors, inductors, state machines or other logic gates, multiplexers, radios, sensors or other electrical or electronic components) can be communicatively coupled to the machine readable medium when the device is operating. In this example, the execution units can be a user (e.g., personnel) of more than one module. For example, under operation, the execution units can be configured by a first set of instructions to implement a first module at one point in time and reconfigured by a second set of instructions to implement a second module. The system 200 as illustrated includes a plurality of separate modules. The modules can be implemented with the division of operations as explained herein or the division of operations can be different such that a single module implements one or more of the operations of two or more of the modules or multiple modules implement the operations of one of the modules.

EXAMPLES AND ADDITIONAL NOTES

Example 1 can include or use subject matter (such as an apparatus, a method, a means for performing operations, or a machine readable memory including instructions that, when performed by the machine, can cause the machine to perform operations), such as can include or use a system comprising a malware analysis lab that provides local and remote access thereto, the system comprising a plurality of local area networks (LANs) comprising a malware analysis zone LAN on which malware analysis is performed, a separation zone LAN communicatively connected to the malware analysis zone LAN, the separation zone LAN providing access control to manage communication of data between other LANs of the plurality of LANs, an analyst zone LAN communicatively connected to the separation zone LAN such that a communication between the analysis zone LAN to the malware analysis zone LAN first goes through the separation zone LAN, the analyst zone LAN providing a malware analyst access to operations of the malware analysis zone LAN and results of malware analysis performed by the malware analysis zone LAN, and/or a remote access zone LAN communicatively connected to the separation zone LAN such that a communication between the remote access zone LAN to the malware analysis zone LAN or the analyst zone LAN first goes through the separation zone LAN, the remote access zone LAN providing a user LAN with results from the malware analysis zone LAN and the analyst zone LAN and providing an item for malware analysis by the malware analysis zone LAN.

Example 2 can include or use, or can optionally be combined with the subject matter of Example 1, to include or use, wherein the plurality of LANs further comprise a tool zone LAN communicatively connected to the separation zone LAN such that a communication between the tool zone LAN to the analyst zone LAN first goes through the separation zone LAN, the tool zone LAN providing the analyst zone LAN access to malware analysis tools for supporting malware analysis and storage of analysis results.

Example 3 can include or use, or can optionally be combined with the subject matter of at least one of Examples 1-2, to include or use, wherein the analyst zone LAN includes virtual machine workstations and physical machine workstations, wherein the virtual machine workstations and physical machine workstations are communicatively connected to the separation zone LAN such that a communication between a virtual machine workstation of the virtual machine workstations and a physical machine workstation of the physical machine workstations first goes through the separation zone LAN.

Example 4 can include or use, or can optionally be combined with the subject matter of at least one of Examples 2-3, to include or use, wherein the remote access zone LAN comprises a bastion host.

Example 5 can include or use, or can optionally be combined with the subject matter of Example 4, to include or use, wherein the bastion host is non-persistent such that the bastion host operates for the duration of an authenticated user connection from a user LAN to the remote access zone LAN and the bastion host resets to a known good state in response to the user disconnecting from the remote access zone LAN.

Example 6 can include or use, or can optionally be combined with the subject matter of Example 5, to include or use, wherein the bastion host is only accessible to a user of a user zone LAN communicatively coupled to the remote access zone LAN through a first firewall.

Example 7 can include or use, or can optionally be combined with the subject matter of Example 4, to include or use, wherein the bastion host is only accessible to a user of a user zone LAN communicatively coupled to the remote access zone LAN through a remote keyboard, video, and mouse (KVM) switch.

Example 8 can include or use, or can optionally be combined with the subject matter of at least one of Examples 4-8, to include or use, wherein the separation zone LAN comprises a second firewall communicatively coupled between the remote access zone LAN and the analyst zone LAN and communicatively coupled between the malware analysis zone LAN and the analyst zone LAN, the second firewall providing port-based access controls for communications thereto.

Example 9 can include or use, or can optionally be combined with the subject matter of Example 8, to include or use, wherein the separation zone LAN further comprises a data diode communicatively coupled between the user zone LAN and the firewall to allow communications between the data diode and the second firewall to flow only to the second firewall and not to the user zone LAN.

Example 10 can include or use, or can optionally be combined with the subject matter of at least one of Examples 8-9, to include or use, wherein the separation zone LAN further comprises a guard communicatively coupled between the user zone LAN and the second firewall to monitor communications from the second firewall to the user zone LAN and pass the communications to the user zone LAN if the communication passes one or more security policy checks enforced by the guard.

Example 11 can include or use subject matter (such as an apparatus, a method, a means for performing operations, or a machine readable memory including instructions that, when performed by the machine, can cause the machine to perform operations), such as can include or use a method for providing local and remote access to a malware analysis lab, the method comprising performing, by a malware analysis zone local area network (LAN), a malware analysis on content, analyzing, by an analyst zone LAN communicatively coupled to the malware analysis zone LAN through a separation zone LAN such that a communication between the analysis zone LAN to or from the malware analysis zone LAN first goes through the separation zone LAN, results of the malware analysis on the content, managing, by the separation zone LAN, communications between the malware analysis zone LAN and the analyst zone LAN by providing port-based access control, and providing, by a remote access zone LAN communicatively coupled to the analyst zone LAN through the separation zone LAN, a user LAN with the results of the malware on the content, the content provided to the malware analysis zone LAN from a communication by the remote access zone LAN and through the separation zone LAN.

Example 12 can include or use, or can optionally be combined with the subject matter of Example 11, to include or use, receiving, by the remote access zone LAN, authentication information from the user LAN, determining whether the authentication information corresponds to a user with sufficient privileges to access the malware analysis lab, in response to determining the user has sufficient privileges, instantiating a bastion host in the remote access zone LAN through which communications are made to the separation zone LAN from the user LAN.

Example 13 can include or use, or can optionally be combined with the subject matter of Example 12, to include or use, receiving an indication that the user with sufficient privileges has disconnected form the remote access zone LAN, and in response to receiving the indication, resetting the bastion host to a known good state.

Example 14 can include or use, or can optionally be combined with the subject matter of Example 13, to include or use receiving, at a keyboard, video, and mouse (KVM) switch communicatively connected between the user zone LAN and the bastion host, the authentication information.

Example 15 can include or use, or can optionally be combined with the subject matter of Example 14, to include or use regulating, using a data diode communicatively coupled between a firewall of the separation zone LAN and the user zone LAN, communications from the user zone LAN to only flow to the firewall and not from the firewall to the user zone LAN.

Example 16 can include or use, or can optionally be combined with the subject matter of Example 15, to include or use monitoring communications from the firewall to the remote access zone LAN, using a guard communicatively coupled between the firewall and the user zone LAN, and passing the communications to the user zone LAN if the communication passes one or more security policy checks enforced by the guard.

Example 17 can include or use subject matter (such as an apparatus, a method, a means for performing operations, or a machine readable memory including instructions that, when performed by the machine, can cause the machine to perform operations), such as can include or use a system that provides local and remote access to a malware analysis lab, the malware analysis lab, the system comprising a plurality of local area networks (LANs) comprising a malware analysis zone LAN on which malware analysis is performed, a separation zone LAN communicatively connected to the malware analysis zone LAN, the separation zone LAN providing access controls to manage communication of data between other LANs of the plurality of LANs, an analyst zone LAN communicatively connected to the separation zone LAN such that a communication between the analysis zone LAN and the malware analysis zone LAN is evaluated by the access controls of the separation zone LAN before being forwarded to a destination LAN, the analyst zone LAN providing a malware analyst access to operations of the malware analysis zone LAN and results of the malware analysis performed by the malware analysis zone LAN, a remote access zone LAN communicatively connected to the separation zone LAN such that a communication between the remote access zone LAN and the malware analysis zone LAN or the analyst zone LAN is evaluated by the access controls of the separation zone LAN before being forwarded to the destination LAN, and a user zone LAN communicatively connected to the remote access zone LAN, the remote access zone LAN providing the user LAN with results from the malware analysis zone LAN and the analyst zone LAN and the user zone LAN providing an item of content for malware analysis by the malware analysis zone LAN to the remote access zone LAN.

Example 18 can include or use, or can optionally be combined with the subject matter of Example 17, to include or use, wherein the remote access zone LAN comprises a non-persistent bastion host such that the bastion host is installed for the duration of an authenticated user connection from a user zone LAN to the remote access zone LAN and the bastion host resets to a known good state in response to a user disconnecting from the user zone LAN.

Example 19 can include or use, or can optionally be combined with the subject matter of Example 18, to include or use, wherein the remote access zone LAN further comprises a remote keyboard, video, and mouse (KVM) switch communicatively coupled between the bastion host and the user zone LAN such that the bastion host is only accessible to the user of the user zone LAN through the KVM switch.

Example 20 can include or use, or can optionally be combined with the subject matter of Example 19, to include or use, wherein the separation zone LAN comprises a network layer firewall communicatively coupled between the remote access zone LAN and the analyst zone LAN and communicatively coupled between the malware analysis zone LAN and the analyst zone LAN, the firewall providing port-based access controls for communications thereto, a data diode communicatively coupled between the user zone LAN and the firewall to allow communications between the data diode and the firewall to flow only to the firewall and not to the user zone LAN, and a guard communicatively coupled between the user zone LAN and the firewall to monitor communications from the firewall to the user zone LAN and pass the communications to the user zone LAN if the communication passes one or more security policy checks enforced by the guard.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising a malware analysis lab that provides local and remote access thereto, the system comprising:
   a plurality of local area networks (LANs) comprising:
   a malware analysis zone LAN on which malware analysis is performed;
   a separation zone LAN communicatively connected to the malware analysis zone LAN, the separation zone LAN providing access control to manage communication of data between other LANs of the plurality of LANs;
   an analyst zone LAN communicatively connected to the separation zone LAN, wherein a communication between the analyst zone LAN and the malware analysis zone LAN first goes through the separation zone LAN, the analyst zone LAN providing a malware analyst access to operations of the malware analysis zone LAN and results of malware analysis performed by the malware analysis zone LAN; and
   a remote access zone LAN communicatively connected to the separation zone LAN wherein (a) a communication between the remote access zone LAN and the malware analysis zone LAN first goes through the separation zone LAN and (b) a communication between the remote access zone LAN and the analyst zone LAN first goes through the separation zone LAN, the remote access zone LAN providing, through the separation zone LAN, a user LAN with results from the malware analysis zone LAN and the analyst zone LAN and providing an item for malware analysis by the malware analysis zone LAN.

2. The system of claim 1, wherein the plurality of LANs further comprise a tool zone LAN communicatively connected to the separation zone LAN wherein a communication between the tool zone LAN and the analyst zone LAN first goes through the separation zone LAN, the tool zone LAN providing the analyst zone LAN access to malware analysis tools for supporting malware analysis and storage of analysis results.

3. The system of claim 1, wherein the analyst zone LAN includes virtual machine workstations and physical machine workstations, wherein the virtual machine workstations and physical machine workstations are communicatively connected to the separation zone LAN wherein a communication between a virtual machine workstation of the virtual machine workstations and a physical machine workstation of the physical machine workstations first goes through the separation zone LAN.

4. The system of claim 1, wherein the remote access zone LAN comprises a bastion host.

5. The system of claim 4, wherein the bastion host is non-persistent wherein the bastion host operates for the duration of an authenticated user connection from a user LAN to the remote access zone LAN and the bastion host resets to a known good state in response to the user disconnecting from the remote access zone LAN.

6. The system of claim 5, wherein the bastion host is only accessible to a user of a user zone LAN communicatively coupled to the remote access zone LAN through a first firewall.

7. The system of claim 4, wherein the remote access zone LAN includes a remote keyboard, video, and mouse (KVM) switch, and the bastion is only accessible to a user of a user zone LAN through the KVM switch.

8. The system of claim 4, wherein the separation zone LAN comprises a firewall communicatively coupled between the remote access zone LAN and the analyst zone LAN and communicatively coupled between the malware analysis zone LAN and the analyst zone LAN, the firewall providing port-based access controls for communications thereto.

9. The system of claim 8, wherein the separation zone LAN further comprises a data diode communicatively coupled between the user zone LAN and the firewall, the data diode to allow communications between the data diode and the firewall to flow only to the firewall and not to the user zone LAN.

10. The system of claim 9, wherein the separation zone LAN further comprises a guard communicatively coupled between the user zone LAN and the firewall to monitor communications from the firewall to the user zone LAN and pass the communications to the user zone LAN if the communication passes one or more security policy checks enforced by the guard.

11. A method for providing local and remote access to a malware analysis lab, the method comprising:
   performing, by a malware analysis zone local area network (LAN), a malware analysis on content;
   analyzing, by an analyst zone LAN communicatively coupled to the malware analysis zone LAN through a separation zone LAN wherein communications between the analyst zone LAN to and from the malware analysis zone LAN first go through the separation zone LAN, results of the malware analysis on the content;
   managing, by the separation zone LAN, communications between the malware analysis zone LAN and the analyst zone LAN by providing port-based access control; and
   providing, by a remote access zone LAN communicatively coupled to the analyst zone LAN through the separation zone LAN, a user LAN with the results of the malware on the content, the content provided to the malware analysis zone LAN from a communication by the remote access zone LAN, wherein (a) a communication between the remote access zone LAN and the malware analysis zone LAN first goes through the separation zone LAN and (b) a communication between the remote access zone LAN and the analyst zone LAN first goes through the separation zone LAN.

12. The method of claim 11, further comprising:
   receiving, by the remote access zone LAN, authentication information from the user LAN;
   determining whether the authentication information corresponds to a user with sufficient privileges to access the malware analysis lab; and
   in response to determining the user has sufficient privileges, instantiating a bastion host in the remote access zone LAN through which communications are made to the separation zone LAN from the user LAN.

13. The method of claim 12, further comprising:
   receiving an indication that the user with sufficient privileges has disconnected form the remote access zone LAN; and
   in response to receiving the indication, resetting the bastion host to a known good state.

14. The method of claim 13, further comprising receiving, at a keyboard, video, and mouse (KVM) switch communicatively connected between the user zone LAN and the bastion host, the authentication information, wherein the bastion host is only accessible to a user of the user zone LAN through the KVM switch.

15. The method claim 14, further comprising:
regulating, using a data diode communicatively coupled between a firewall of the separation zone LAN and the user zone LAN, communications from the user zone LAN to only flow to the firewall and not from the firewall to the user zone LAN.

16. The method of claim 15, further comprising:
monitoring communications from the firewall to the remote access zone LAN, using a guard communicatively coupled between the firewall and the user zone LAN; and
passing the communications to the user zone LAN if the communication passes one or more security policy checks enforced by the guard.

17. A system that provides local and remote access to a malware analysis lab, the system comprising a plurality of local area networks (LANs) comprising:
a malware analysis zone LAN on which malware analysis is performed;
a separation zone LAN communicatively connected to the malware analysis zone LAN, the separation zone LAN providing access controls to manage communication of data between other LANs of the plurality of LANs;
an analyst zone LAN communicatively connected to the separation zone LAN wherein a communication between the analyst zone LAN and the malware analysis zone LAN is evaluated by the access controls of the separation zone LAN before being forwarded to a destination LAN, the analyst zone LAN providing a malware analyst access to operations of the malware analysis zone LAN and results of the malware analysis performed by the malware analysis zone LAN;
a remote access zone LAN communicatively connected to the separation zone LAN wherein a communication between the remote access zone LAN and the malware analysis zone LAN or the analyst zone LAN is evaluated by the access controls of the separation zone LAN before being forwarded to the destination LAN; and
a user zone LAN communicatively connected to the remote access zone LAN, the remote access zone LAN providing the user LAN with results from the malware analysis zone LAN and the analyst zone LAN and the user zone LAN providing an item of content for malware analysis by the malware analysis zone LAN to the remote access zone LAN;
wherein (a) a communication between the analyst zone LAN and the malware analysis zone LAN first goes through the separation zone LAN, and (b) a communication between the analyst zone LAN and the remote access zone LAN first goes through the separation zone LAN.

18. The system of claim 17, wherein the remote access zone LAN comprises a non-persistent bastion host wherein the bastion host operates for the duration of an authenticated user connection from a user zone LAN to the remote access zone LAN and the bastion host resets to a known good state in response to a user disconnecting from the user zone LAN.

19. The system of claim 18, wherein the remote access zone LAN further comprises a remote keyboard, video, and mouse (KVM) switch communicatively coupled between the bastion host and the user zone LAN wherein the bastion host is only accessible to the user of the user zone LAN through the KVM switch.

20. The system of claim 19, wherein the separation zone LAN comprises:
a network layer firewall communicatively coupled between the remote access zone LAN and the analyst zone LAN and communicatively coupled between the malware analysis zone LAN and the analyst zone LAN, the firewall providing port-based access controls for communications thereto;
a data diode communicatively coupled between the user zone LAN and the firewall, the data diode to allow communications between the data diode and the firewall to flow only to the firewall and not to the user zone LAN; and
a guard communicatively coupled between the user zone LAN and the firewall to monitor communications from the firewall to the user zone LAN and pass the communications to the user zone LAN if the communication passes one or more security policy checks enforced by the guard.

* * * * *

UNITED STATES PATENT AND TRADEMARK OFFICE
CERTIFICATE OF CORRECTION

PATENT NO. : 9,876,810 B2
APPLICATION NO. : 14/959547
DATED : January 23, 2018
INVENTOR(S) : McDougal et al.

Page 1 of 1

It is certified that error appears in the above-identified patent and that said Letters Patent is hereby corrected as shown below:

In the Specification

In Column 1, Line 41, delete "Illustrates," and insert --illustrates,-- therefor In Column 5, Line 17, after "104", insert --.--

In Column 5, Line 66, delete "work station(s)" and insert --workstation(s)-- therefor In Column 8, Line 27, delete "224." and insert --112.-- therefor In Column 9, Line 65, delete "400." and insert --500.-- therefor In the Claims In Column 18, Line 51, in Claim 12, delete "mal ware" and insert --malware-- therefor In Column 19, Line 1, in Claim 15, after "method", insert --of--

Signed and Sealed this
Fourth Day of June, 2019

Andrei Iancu
*Director of the United States Patent and Trademark Office*